C. SCHENK.
CAKE MIXER.
APPLICATION FILED JULY 29, 1910.

1,014,909.

Patented Jan. 16, 1912.
3 SHEETS—SHEET 1.

Witnesses:
H. J. Hansen
B. G. Richards

Inventor:
Charles Schenk,
By Joshua R. H. Potts
Attorney.

C. SCHENK.
CAKE MIXER.
APPLICATION FILED JULY 29, 1910.

1,014,909.

Patented Jan. 16, 1912.
3 SHEETS—SHEET 2.

Witnesses:
H. J. Hansen
B. G. Richards

Inventor:
Charles Schenk,
By Joshua R. H. Potts
Attorney.

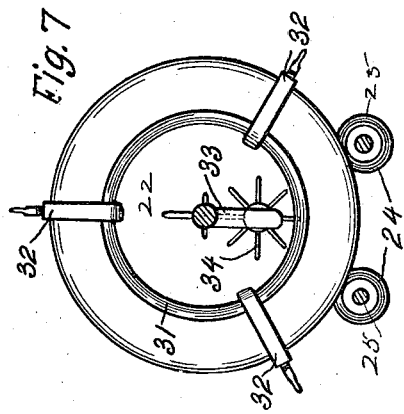
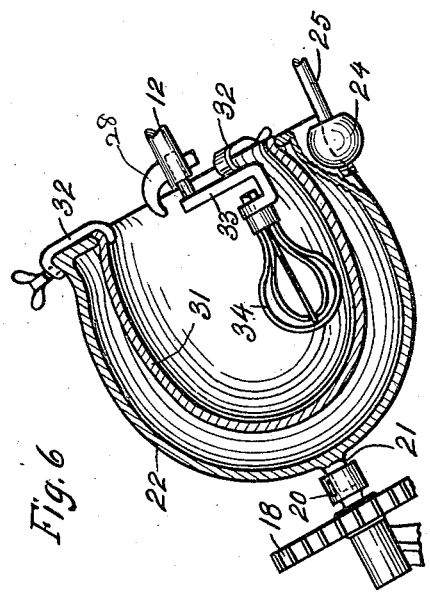
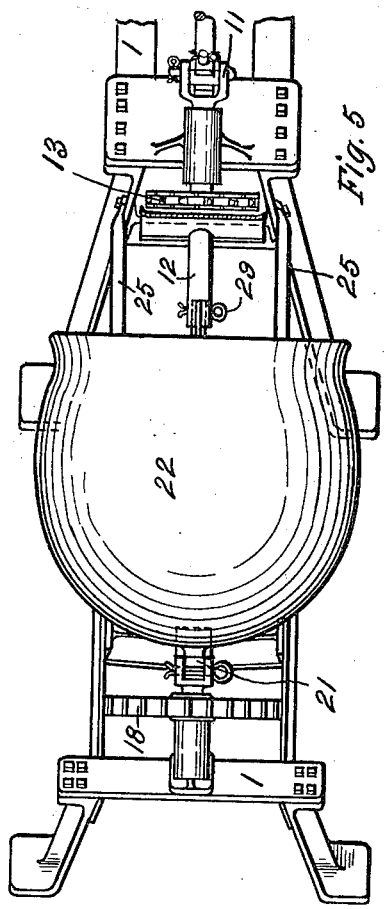

UNITED STATES PATENT OFFICE.

CHARLES SCHENK, OF CHICAGO, ILLINOIS.

CAKE-MIXER.

1,014,909.  Specification of Letters Patent.  Patented Jan. 16, 1912.

Application filed July 29, 1910. Serial No. 574,581.

*To all whom it may concern:*

Be it known that I, CHARLES SCHENK, a citizen of the United States, and a resident of Chicago, county of Cook, and State of Illinois, have invented certain new and useful Improvements in Cake-Mixers, of which the following is a specification.

My invention relates to improvements in cake mixers and has for its object the production of a cake mixer which is of simple construction and efficient in operation.

The invention consists in the combination and arrangement of parts hereinafter described and claimed.

Figure 1:
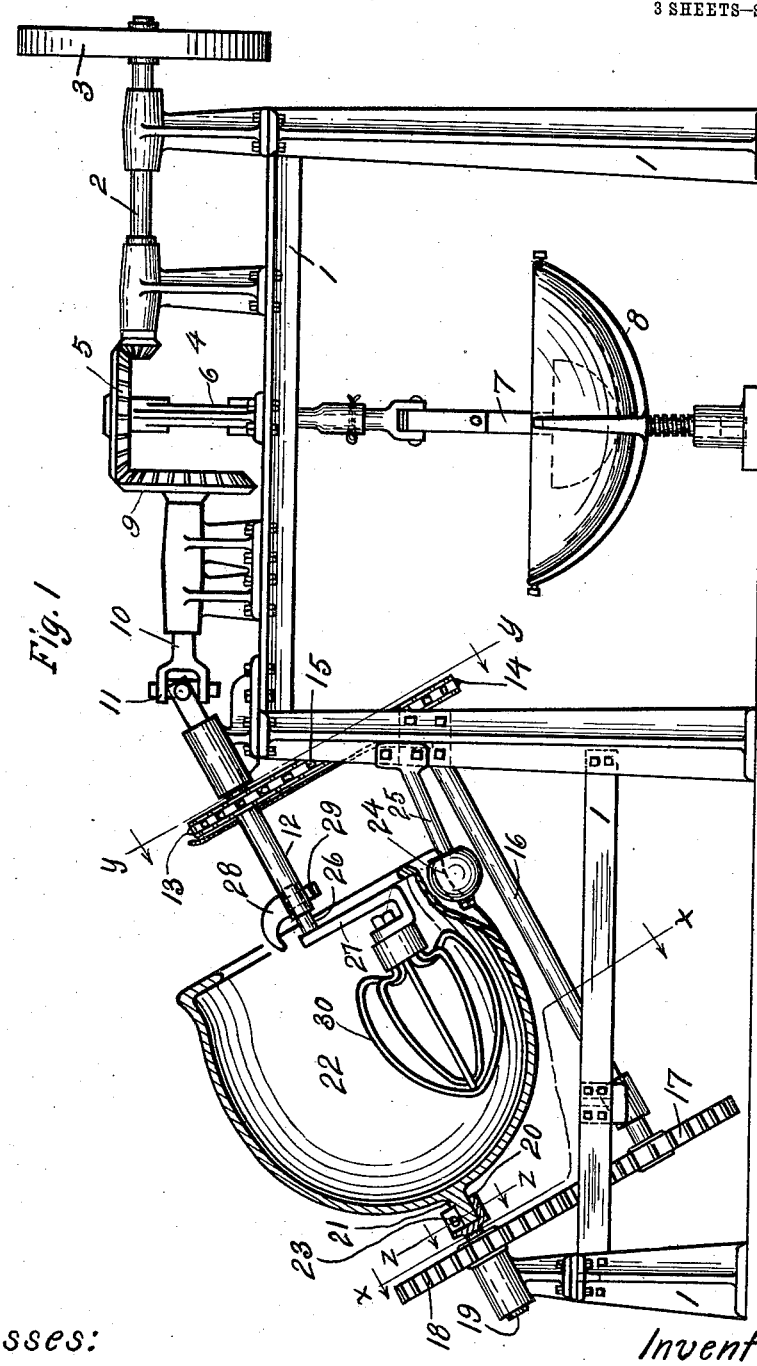
Figure 3:
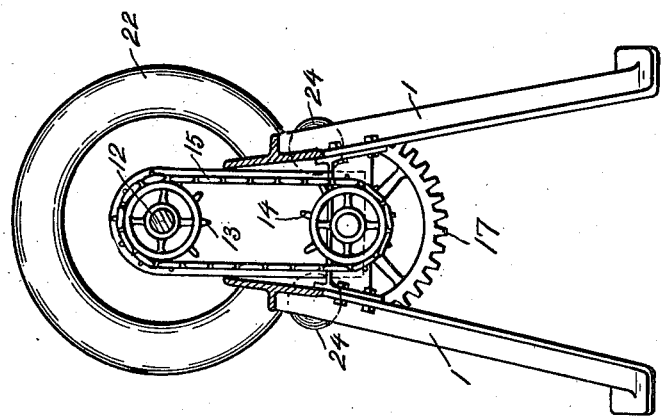
Figure 4:
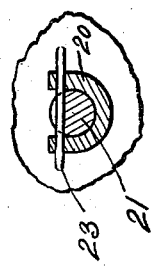
Figure 2:
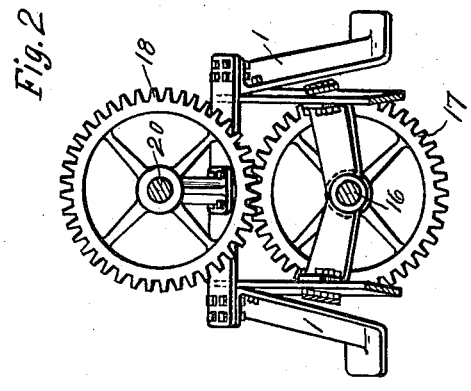

The invention will be best understood by reference to the accompanying drawings forming a part of this specification, and in which, Figure 1 is a sectional elevation of a cake stirrer embodying my invention, Fig. 2 is a section on line $x$—$x$ of Fig. 1, Fig. 3 is a section on line $y$—$y$ of Fig. 1, Fig. 4 is an enlarged section on line $z$—$z$ of Fig. 1, Fig. 5 is a plan view of the inclined stirrer bowl employed in the device, the same being taken in a plane parallel with the axis of said stirrer, Fig. 6 is a section of the inclined stirrer bowl illustrating a smaller bowl and stirrer inserted in the first mentioned bowl, and Fig. 7 is an end view of the same, taken in a plane perpendicular to the axis of the bowls.

The preferred form of construction as illustrated in the drawings comprises a suitable frame 1 having a horizontal shaft 2 mounted therein. Shaft 2 is driven by means of a pulley 3 and a belt connected with any suitable source of power. At its inner end shaft 2 carries a bevel gear 4 meshing with a bevel gear 5 on the upper end of a vertical stirrer shaft 6, as shown. Shaft 6 carries at its lower end a stirrer 7 operating in a vertically adjustable bowl 8, as indicated. The stirrer 6 and bowl 8 form a part of the subject matter of my prior application above referred to and need no further description here. Bevel gear 5 also meshes with a bevel gear 9 carried by a horizontal shaft 10 having a universal joint connection 11 with the upper end of an inclined shaft 12. Shaft 12 is connected by means of sprocket wheels 13 and 14 and sprocket chain 15 with a counter shaft 16 arranged parallel thereto. At its lower end shaft 16 carries a spur gear 17 meshing with a spur gear 18 carried by a supplemental shaft 19 mounted in frame 1 in axial alinement with shaft 12. At its upper end shaft 19 carries a socket 20 adapted to receive a stud 21 projecting from the lower central portion of a mixing bowl 22. Stud 21 is removably secured in socket 20 by means of a pin 23 which also serves to prevent rotation of said stud in said socket. The upper end of bowl 22 is supported on rollers 24 rotatably mounted on brackets 25 secured to the sides of frame 1, as shown, the said bowl being mounted in axial alinement with shaft 12. At its lower end shaft 12 is provided with a socket adapted to receive a stud 26 carried by a crank arm 27, the said stud being removably secured in said socket by means of a key 28 passing through suitable notches in said shaft and stud, and locked in position by means of a cotter pin 29 passing through the lower end thereof. Crank arm 27 carries a stirrer 30 operating in bowl 22, as shown. By this arrangement it will be seen that upon rotation of shaft 10 the bowl 22 will be rotated in one direction and the crank arm 27 and stirrer 30 rotated in said bowl in an opposite direction, this action being especially adapted for the mixing of light cake, such as angel food, etc.

In case it is desired to mix a smaller quantity of dough, I provide a smaller bowl 31 adapted to fit within the open upper end of bowl 22 and be secured therein by means of screw clamps 32, as shown. I also provide a smaller crank arm 33 and stirrer 34 adapted to be removably secured to the end of shaft 12 and operate in smaller bowl 31.

While I have illustrated and described the preferred form of construction for carrying my invention into effect this is capable of variation or modification without departing from the spirit of the invention. I therefore do not wish to be limited to the exact details set forth but desire to avail myself of such variations and modifications as come within the scope of the appended claims.

Having described my invention what I claim as new and desire to secure by Letters Patent is:

1. A dough stirrer comprising a frame; an inclined shaft rotatably mounted in said frame; means for rotating said inclined shaft; a supplemental shaft mounted in alinement with said inclined shaft; a bowl provided with an opening in its top and means at its bottom removably engaging the upper end of said supplemental shaft; supporting rollers secured to said frame and arranged to rotatably support said bowl in axial alinement with said inclined shaft; a crank arm on said inclined shaft and operating in said bowl; a stirrer on said crank arm; a counter shaft mounted in said frame parallel with the axis of said bowl; a sprocket wheel and chain between said inclined and counter shafts; and gears connecting said counter and supplemental shafts, substantially as described.

2. A dough stirrer comprising a frame; a horizontal shaft mounted in said frame; an inclined shaft having a universal joint connection with said horizontal shaft; a supplemental shaft mounted in alinement with said inclined shaft; a socket on the upper end of said supplemental shaft; a bowl provided with a central stud at its bottom fitting said socket and having an opening in its top; supporting rollers secured to said frame and arranged to rotatably support said bowl in axial alinement with said inclined shaft; a crank arm on said inclined shaft and operating in said bowl; a stirrer on said crank arm; a counter shaft mounted in said frame parallel with the axis of said bowl; a sprocket wheel and chain connection between said inclined and counter shafts; and gears connecting said counter and supplemental shafts, substantially as described.

In testimony whereof I have signed my name to this specification in the presence of two subscribing witnesses.

CHARLES SCHENK.

Witnesses:
HELEN F. LILLIS,
JOSHUA R. H. POTTS.

---

Copies of this patent may be obtained for five cents each, by addressing the "Commissioner of Patents, Washington, D. C."